(12) United States Patent
Alford et al.

(10) Patent No.: US 6,887,291 B2
(45) Date of Patent: May 3, 2005

(54) FILTER DEVICES AND METHODS FOR CARBON NANOMATERIAL COLLECTION

(75) Inventors: J. Michael Alford, Lakewood, CO (US); Michael D. Diener, Denver, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 25 days.

(21) Appl. No.: 10/098,828

(22) Filed: Mar. 15, 2002

(65) Prior Publication Data

US 2003/0041732 A1 Mar. 6, 2003

Related U.S. Application Data

(60) Provisional application No. 60/316,423, filed on Aug. 30, 2001.

(51) Int. Cl.[7] .......................... C01B 31/02; B01D 46/00
(52) U.S. Cl. ............................. 55/302; 55/412; 55/426; 55/459.1; 95/279; 95/280; 95/19; 95/90; 96/11; 96/52; 209/12.2; 209/130; 209/722; 423/445; 423/449; 423/450; 423/452
(58) Field of Search .......................... 55/392, 412, 426, 55/459.1, 523, 529, 302; 95/19, 90, 279, 280; 96/11, 52; 209/12.2, 130, 722; 423/445, 449, 450, 452

(56) References Cited

U.S. PATENT DOCUMENTS

| | | | |
|---|---|---|---|
| 3,710,279 A | * | 1/1973 | Ashkin .......................... 55/529 |
| 3,739,557 A | | 6/1973 | Anderson et al. |
| 3,816,978 A | | 6/1974 | O'Dell |
| 3,955,947 A | | 5/1976 | Hoon et al. |
| 4,082,523 A | | 4/1978 | Pausch |
| 4,259,095 A | | 3/1981 | Johnson, Jr. |
| 4,329,162 A | | 5/1982 | Pitcher, Jr. |
| 4,673,349 A | | 6/1987 | Abe et al. |
| 4,853,010 A | * | 8/1989 | Spence et al. .................. 96/52 |
| 4,889,481 A | | 12/1989 | Morris et al. |
| 5,227,038 A | | 7/1993 | Smalley et al. |
| 5,273,729 A | | 12/1993 | Howard et al. |
| 5,304,366 A | | 4/1994 | Lorents et al. |
| 5,316,636 A | | 5/1994 | Bunshah et al. |

(Continued)

FOREIGN PATENT DOCUMENTS

| | | |
|---|---|---|
| JP | 6056414 A2 | 3/1994 |
| JP | 7138009 A2 | 5/1995 |

OTHER PUBLICATIONS

Bachmann et al. (1994), "The formation of $C_{60}$ and its precursors in naphthalene flames," Chem. Phys. Lett. 223:506–510.

(Continued)

Primary Examiner—Minh-Chau T. Pham
(74) Attorney, Agent, or Firm—Greenlee, Winner and Sullivan, P.C.

(57) ABSTRACT

Filter devices and methods for collection of carbon nanomaterials, including fullerenes, produced in gas phase reactors are provided. The filter devices provide for in situ cleaning of filters to release captured product for collection. Product can be released and removed from the reactor without disrupting continuous synthesis of carbon nanomaterials. The filter devices facilitate increased reactor operation and larger scale production of carbon nanomaterials. The filters are cleaned by application of a motive force and/or a gas flow to the filter. In a specific embodiment filters are cleaned by a reverse flow of gas pulses to the filter provided. The invention also provides reactor systems for gas phase synthesis of carbon nanomaterials that can be operated continuously employing the filter device of this invention. Preferred reactor systems are those which synthesize carbon nanomaterials by combustion. Methods for continuous production of carbon nanomaterials using the filtering devices and methods of this invention are also provided.

37 Claims, 2 Drawing Sheets

U.S. PATENT DOCUMENTS

| | | | |
|---|---|---|---|
| 5,393,327 A | | 2/1995 | Chambers et al. |
| 5,395,409 A | | 3/1995 | Klimczak et al. |
| 5,470,222 A | | 11/1995 | Holowczak et al. |
| 5,562,746 A | | 10/1996 | Raether |
| 5,800,580 A | | 9/1998 | Feldt |
| 5,837,017 A | | 11/1998 | Santschi et al. |
| 5,876,684 A | | 3/1999 | Withers et al. |
| 5,972,079 A | * | 10/1999 | Foley et al. .................... 96/11 |
| 5,985,232 A | | 11/1999 | Howard et al. |
| 6,090,173 A | | 7/2000 | Johnson et al. |
| 6,162,411 A | | 12/2000 | Howard et al. |
| 6,387,156 B1 | * | 5/2002 | Richardson, Jr. et al. ....... 95/19 |
| 6,551,383 B1 | * | 4/2003 | Richardson, Jr. et al. ....... 95/90 |

OTHER PUBLICATIONS

Bogdanov, A.A. et al. (May 2000), "Development Prospects of the Commercial Production of Fullerenes," Tech. Phys. 45(5):521–527.

Curl et al. (Oct. 1991), "Fullerenes," Sci. Am. pp. 54–63.

Diederich et al. (1991), "The Higher Fullerenes: Isolation and Characterization of $C_{76}$, $C_{84}$, $C_{90}$, $C_{94}$, and $C_{70}O$, an Oxide of $D_{5h}$–$C_{70}$," Science 252:548–551.

Diener, M.D. et al. (Sep. 2000—web published), "Synthesis of Single–Walled Carbon Nanotubes in Flames," J. Phys. Chem. B 104:9615–9620.

Hebgen, P. and Howard, J.B. (1999), "Synthesis of Fullerenes in Low Pressure Benzene/Oxygen Diffusion Flames," Fifth Int'l Microgravity Combustion Workshop, K.R. Sachsteder and J.S. Tien (eds.) NASA/CP 1999–208917, pp. 137–140.

Homann, K.-H. (1998), "Fullerenes and Soot Formation—New Pathways to Large Particles in Flames," Angew, Chem. Int. Ed. 37:2434–2451.

Howard et al. (1991), "Fullerenes $C_{60}$ and $C_{70}$ in flames," Nature 352:139–141.

Howard et al. (1992), "Production of $C_{60}$ and $C_{70}$ Fullerenes in Benzene–Oxygen Flames," J. Phys. Chem. 96:6657–6662.

Howard et al. (1992), "Fullerenes Synthesis in Combusion," Carbon 30:1183–1201.

Krätschmer et al. (1990), "Solid $C_{60}$: a new form of carbon," Nature 347:354–358.

McKinnon et al. (1992), "Combustion Synthesis of Fullerenes," Comb. Flame 88:102–112.

Taylor et al. (1993), "Formation of $C_{60}$ by pyrolysis of naphthalene," Nature 366:728–731.

Zhang et al. (1999), "Laser Ablation Mass Spectrometry of Pyrolyzed Koppers Coal–Tar Pitch: A Precursor for Fullerenes and Metallofullerenes," J. Phys. Chem. B 103:9450–9458.

* cited by examiner

FILTER DEVICES AND METHODS FOR CARBON NANOMATERIAL COLLECTION

CROSS-REFERENCE TO RELATED APPLICATIONS

This invention takes priority from U.S. provisional Patent Application No. 60/316,423 filed Aug. 30, 2001, which is hereby incorporated by reference to the extent not inconsistent with the disclosure herein.

STATEMENT REGARDING FEDERALLY SPONSORED RESEARCH OR DEVELOPMENT

This invention was made with government support from the National Science Foundation under contract number DMI-9314831. The United States government has certain rights in this invention.

BACKGROUND OF THE INVENTION

This invention is in the field of carbon nanomaterials including fullerenes and, in particular, relates to the continuous synthesis of such materials. The invention more specifically relates to filter devices and methods for collection of carbon nanomaterials which provide for in situ cleaning to facilitate continuous operation.

The term "carbon nanomaterials" is used generally herein to refer to any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, fullerenes, single-walled carbon nanotubes (SWNTs), multiple-walled carbon nanotubes (MWNTs), nanotubules, and nested carbon structures with dimensions on the order of nanometers. The term "fullerene" is used generally herein to refer to any closed cage carbon compound containing both six-and five-member carbon rings independent of size and is intended to include the abundant lower molecular weight $C_{60}$ and $C_{70}$ fullerenes, larger known fullerenes including $C_{76}$, $C_{78}$, $C_{84}$ and higher molecular weight fullerenes $C_{2N}$ where N is 50 or more. The term is intended to include "solvent extractable fullerenes" as that term is understood in the art (generally including the lower molecular weight fullerenes that are soluble in toluene or xylene) and to include higher molecular weight fullerenes that cannot be extracted, including giant fullerenes which can be at least as large as $C_{400}$. Carbon nanomaterials may be produced in soot and, in certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The term "carbon nanomaterials," when used without limitation, is intended to include soot containing detectable amounts of carbon nanomaterials. For example, the term "fullerenic soot" is used in the art to refer to soot containing fullerenes. Fullerenic soot is encompassed by the term carbon nanomaterials.

Various carbon nanomaterials have different potential uses based on their various properties. Fullerenes are potentially useful as therapeutics, in electronics processing and in energy conversion. Fullerenic soots may offer advantages in carbon blacks as sorbent or as additives in tire production. Nanotubes have potential application as reinforcements in composite materials, electronic devices and display technologies.

While the art recognizes significant potential for commercial application of carbon nanomaterials, the high costs and difficulty in obtaining these materials in large amounts necessary for developing these applications has been a major impediment in practical application of these materials.

Carbon nanomaterials, including fullerenes SWNTs and MWNTs, can be produced by a variety of methods including, without limitation, arc methods (e.g., U.S. Pat. Nos. 5,227,038 and 5,876,684); combustion methods (U.S. Pat. Nos. 5,273,729; 5,985,232; and 6,162,411; Howard et al. (1991) Nature 352:139–141; Howard et al. (1992) J. Phys. Chem. 96:6657; Howard et al. (1992) Carbon 30:1183 and McKinnon et al. (1992) Comb. Flame 88:102; Taylor et al. (1993) Nature 366:728–731); electric beam evaporation (e.g., U.S. Pat. No. 5,316,636); laser ablation (Zhang et al. (1999) J. Phys. Chem. B 103:9450.)

In such processes, carbon nanomaterials are collected after generation inside a processing chamber, for example, by scraping product from collection surfaces (W. Kratschmer et al, 1990, Nature, Vol. 347, pp. 354–357), or outside the processing chamber in a tubular condenser (Lorents et al., U.S. Pat. No. 5,304,366), in a glass wool filter system (P. Hebgen and J. B. Howard, (1999) Fifth Int'l Microgravity Combustion Workshop, K. R. Sachsteder and J. S. T'ien (eds.) NASA/CP 1999–208917, p. 137) or in a bag-like paper filter (Makato, K. et al., 1995, Japanese Abstract JP7138009A2). A two stage collection method using a product recovery tank to collect most of the product in combination with a bag filter to capture additional product is reported in Katshuhide, M et al., 1994, Japanese Abstract JP6056414A2. None of these product collection methods, however, allow cleaning of the collection surface while carbon nanomaterial production is ongoing, unless more than one collector is used sequentially. Lorents et al., U.S. Pat. No. 5,304,366 report the use of multiple collectors for carbon nanomaterials where one collector can be taken off line, while the other collector remains in operation.

There is a need in the art for larger-scale generation and lower-cost production of carbon nanomaterials to facilitate their practical application. The development of continuous processes for synthesis of carbon nanomaterials is one way to scale up synthesis and decrease cost. To enable lower cost production of carbon nanomaterials, devices and collection methods that can operate without halting the synthetic processes are needed. There also exists a need in the art for collection devices and methods that are generally compatible with the variety of synthetic methods for carbon nanomaterials that are known in the art. The devices and methods herein provide such versatility and facilitate continuous operation.

SUMMARY OF THE INVENTION

To facilitate continuous synthesis of carbon nanomaterials, the invention provides a filter device that can be cleaned in situ within a reaction system for collection of carbon nanomaterials without taking the filter off line, and in which collected products can be removed from the reaction system without interrupting synthesis.

The collection filter device is cleaned in situ within the reactor system to release captured carbon nanomaterials by application of a motive force to the filter. The motive force is applied while the filter is in place for capture of product materials. Carbon nanomaterials are dislodged from the filter such that they are collected for removal from the reactor without disrupting continuing synthesis. The motive force is selectively applied to the filter within the reactor system to release captured product without requiring the reactor to be opened or the filter to be removed from the reactor system. The motive force can be applied to the filter in a variety of ways, typically being actuated selectively from outside of the processing chamber. The motive force can, for example, be mechanically applied directly by tapping, rapping, vibrating, shaking or otherwise mechanically moving the filter while it remains in the product gas stream.

The motive force applied, can, for example, cause the filter to move sharply to dislodge collected carbon nanomaterials which then fall under gravity to a receptor or collector. Alternatively, gas flows can be applied to the filter, particularly reverse gas flow in which gas flow is applied to the downstream side of the filter (where downstream is defined with respect to product gas flow), to directly dislodge collected product from filter pores. The motive force can also be applied indirectly by generating gas flows which contact the filter applying a motive force thereto and dislodging collected material. In a preferred embodiment a motive force is applied to the filter by directing gas flow from an external source of gas to the filter. In this embodiment, the gas flow contacting the filter can both apply motive force to the filter to dislodge collected products, and dislodge collected product from filter pores. Reverse gas flow is preferred for dislodging collected products from filter pores. In specific embodiments, the gas flow is provided in the form of pulsed jets of gas, which are more preferably high pressure gas pulses which can for example be provided by use of venturi nozzles. In this embodiment, pulsed high pressure gas can directly dislodge collected product from pores by gas flow and also cause a shock wave along the filter providing motive force to dislodge collected product.

The collection devices and methods of this invention provide for removal of carbon nanomaterials from a processing reactor without disrupting continuing synthesis of carbon nanomaterials and allow for continuous synthesis in the reactor system to generate products. Collected products dislodged from the filter fall into a receptor or collector which may be shaped to facilitate removal of dislodged product from the reactor. The receptor or collector is accessible from outside of the synthesis chamber to allow product removal without disruption of product gas flow or continuing synthesis in the reactor. A variety of inlets can be employed to provide such access.

The filter device of this invention comprises one or more gas-permeable filters in fluid communication with a reactor for synthesis of carbon nanomaterials to receive product gas flow from the reactor. At least a substantial portion of the product gas flow from the reactor passes through the one or more filters so that carbon nanomaterials entrained in the product gas flow are captured on the filter(s). The filter may capture soot or other particles containing lower molecular weight carbon nanomaterials. The filter device also comprises a filter cleaning mechanism for dislodging captured carbon nanomaterials. This mechanism conveys a motive force to a filter to dislodge captured material. The motive force is applied without removing the filter from the product gas flow and without interrupting the flow of product gas through the filter. The filter device further comprises an outlet in the reaction system for removing dislodge carbon nanomaterials without interrupting the flow of product gas through the filter. In one embodiment, a product receptor or collector is employed which can be separated from the reactor, cleaned of product, and replaced without interrupting synthesis.

The filter device of this invention comprises one or more gas-permeable filters, and a filter cleaning mechanism. The filter(s) are in fluid communication with a reactor for synthesis of carbon nanomaterials and are positioned to receive product gas flow from the reactor. The product gas flow passes through the filter, from an upstream to a downstream side of the filter, and carbon nanomaterials entrained in the product gas are captured on the filter.

The filter cleaning mechanism applies motive force to the filter to dislodge materials. In a preferred embodiment, the filter cleaning mechanism provides gas flow to the filter to dislodge materials. Preferably the gas flow is a reversed flow (compared to product gas flow) and is applied to the downstream side of the filter. Preferably, the gas flow is provided as pulsed jets of gas. Filter cleaning using gas flow conveys motive force to the filter, and also provides a flow of gas through the pores of the filter, either or both of which mechanisms can result in dislodging captured material.

The filter device can also comprise a product receptor or collector for collecting materials dislodged from the filter(s). The product collector may simply be a surface of the reactor which is accessible for removal of collected product as desired. The product collector can include an enclosure for product collection which can be selectively isolated from the reactor system.

This invention also provides a method for collecting carbon nanomaterials from a synthetic reactor using a filter device of this invention. The method includes providing one or more filters to intercept product gas flow from the reactor and periodically applying a motive force and/or gas flow to the filter(s) to dislodge captured materials. The method further comprises periodically removing dislodged materials from the reactor. Filter cleaning and removal of product materials from the reactor is performed without removing the filter from the product gas flow and without halting product gas flow from the reactor.

The invention also provides a reactor system and method for the continuous production of carbon nanomaterials. The continuous production method of this invention employs a reactor for synthesis of carbon nanomaterials in which the product carbon nanomaterials are continuously collected from product gas flow from the reactor in a filtering device of this invention and released or dislodged from the filter by application of a motive force and/or gas flow without removing the filter from the product gas flow of the reactor and without halting synthesis in the reactor system. The continuous method for production of carbon nanomaterials of this invention can employ any method for synthesis of carbon nanomaterials which generates a product gas flow which entrains the carbon nanomaterials. In particular, arc synthesis or combustion synthesis, as these methods are known and understood in the art, can be employed in the devices and methods of this invention.

Carbon nanomaterials generated in a synthetic reactor are conveyed to the filter by product gas flow pumped out of the reactor. The filter is positioned to receive product gas flow and capture carbon nanomaterials therein. Product captured on the filter is dislodged from the filter by application of a motive force and/or gas flow to the filter as described above. On release from the filter, the product carbon nanomaterials are collected for removal from the reactor. In one embodiment, a product collector is positioned in selective communication with the reactor system so as to receive product released from the filter. The product collector can be isolated from the reactor (e.g., by closing a valve) to allow removal of product without disrupting gas flow in the reactor.

The combination of the filtering device of this invention with reactor systems for synthesis of carbon nanomaterials allows cleaning of the collection surface during continuous carbon nanomaterial production, and converts what have historically been batch synthesis processes into continuous processes. The use of the devices and methods of this invention will lower the costs of production, increase the scale of the production of carbon materials and will significantly improve the availability of these materials in quantities that facilitate their practical application.

DETAILED DESCRIPTION OF THE INVENTION

Figure 1:
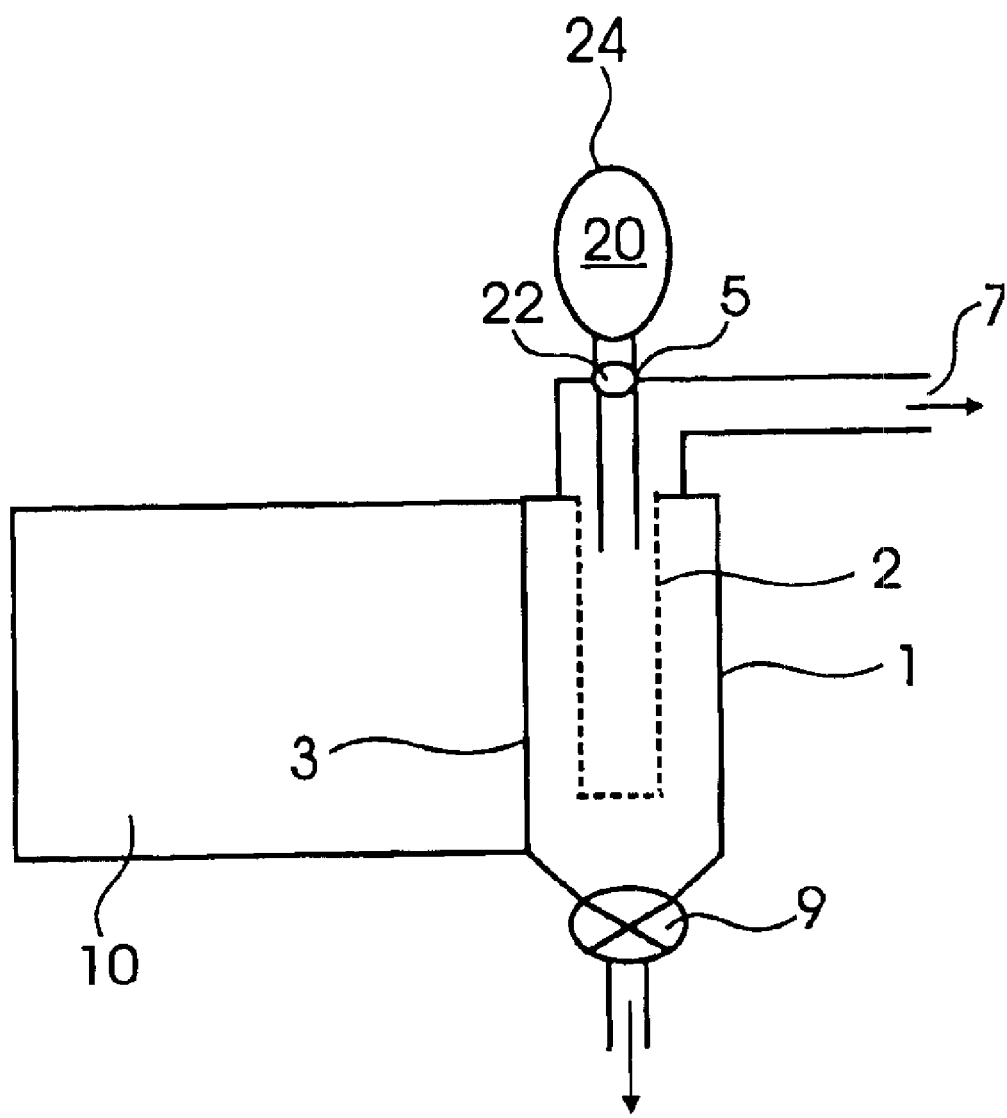
FIG. 1 schematically illustrates a pulse jet-cleaned filter device for collection of carbon nanomaterials.

The invention provides improved methods and devices for the synthesis and collection of carbon nanomaterials including fullerenes and fullerenic soot. In specific and preferred embodiments, the synthesis of carbon nanomaterials is continuous. The term "continuous" in reference to the synthesis process herein is used to distinguish over batch processes in which a batch amount of product is generated and collected on walls, filters or other surfaces in a reaction systems, the process is halted and the product is removed from the system (i.e., product is removed from one or more walls and/or the filter is cleaned to remove collected product.)

Improved reactor systems for carbon nanomaterials comprise:
- a carbon nanomaterials synthesis reactor that generates carbon nanomaterials entrained in a product gas flow from the reactor;
- a filter positioned for receiving and capturing carbon nanomaterials entrained in the product gas flow;
- a filter cleaner for selectively applying motive force and/or gas flow to the filter to release carbon nanomaterials captured by the filter; and
- a product collector for receiving carbon nanomaterial released from the filter which can be selectively accessed to allow removal of collected released product without disruption of continuing product synthesis.

Carbon nanomaterials captured in the filter are released by application of a motive force and/or gas flow by the filter cleaner. The motive force can be applied, for example, by mechanically tapping, rapping, rocking, shaking, vibrating or otherwise moving the filter without removing the filter from the product gas flow. In a specific embodiment, motive force can be applied to the filter by application of a pulsed or discontinuous flow of gas to the filter. High pressure pulses or jets of gas can be used to apply a shock wave to the filter to dislodge collected product. Gas flow, particularly reverse-gas flow, can be applied to the filter to pass through filter pores to directly dislodge collected product.

In a filter cleaner of this invention that employs gas pulses for cleaning the filter, the motive force, shock wave or gas pulse or gas flow is selectively applied by activating a flow or pulse of gas toward the filter. One or more gas pulses dislodge captured product from the filter. Gas flow may be activated periodically at selected intervals during reactor operation or may be activated responsive to a system parameter such as reaching a maximum pressure within the reactor.

In a specific embodiment, the filter cleaner of this invention comprises one or more gas inlets in the reactor in the vicinity of the filter to generate a discontinuous flow or pulses of gas directed toward the filter to dislodge carbon nanomaterial from the filter. In preferred embodiments, the gas flow is provided as pulsed jets of gas and the gas flow is directed to the downstream side of the filter.

The product receptor or collector of the filter device may be integral with a wall of the reactor (e.g., a depression in a wall) and positioned with respect to the filter for receiving product dislodged there from. Alternatively the collector can be a separate container for receiving release products which can be isolated from the reactor. The product collector can be selectively accessed for removal of collected product without disruption of synthesis of carbon nanomaterials. In one embodiment, an external valve (e.g., an outlet) can be opened to remove product from the reactor. In another embodiment, the product collector is selectively isolated (e.g., by a valve) from the reactor. In this case, the valve is open when the filter is being cleaned and is thereafter closed to isolate the product collector from the reactor and allow removal of product. After product removal from the collector, and product buildup on the filter, the filter can be cleaned again by application of motive force and/or gas flow, and the valve is reopened to allow product collection.

The filter device of this invention allows filter cleaning and product removal without halting product synthesis and without removal of the filter from the flow of product gases generated during synthesis. Prior to this invention, it was necessary in the production of carbon nanomaterials to interrupt product synthesis to clean collector surfaces and remove product or to remove the filter from the flow of product gases generated during synthesis. Application of the filter device and method of this invention significantly extends the operational time of the synthetic reactor so that it can be run essentially as a continuous reactor operation.

FIG. 1 illustrates a pulse jet-cleaned filter device for collection of carbon nanomaterials. The filter chamber (1) has an inlet (3) which is connected to a carbon nanomaterial synthesis reactor (10). The reactor produces a product gas stream which entrains at least one carbon nanomaterial. The carbon nanomaterials can either be entrained as a result of the synthesis process or entrained for the purposes of using the collection device of the invention, e.g., carbon nanomaterials not generated in a product gas flow may be entrained in a gas flow for filtering and collection. Suitable carbon nanomaterial synthesis methods compatible with the invention include combustion methods, (i.e., sooting flames), carbon arcs, pyrolysis of hydrocarbons (with or without a plasma), laser ablation, and rf plasmas. In a preferred embodiment, the invention is used with combustion methods, particularly sooting flame synthesis methods.

The filter chamber (1) contains a gas permeable filter (2). The gas permeable filter is positioned so that a substantial portion, and preferably all of the product gas stream from the reactor (10) passes through the filter. As the product gas stream flows through the filter, the carbon nanomaterials entrained in the gas stream impinge on the filter, are separated from the product gas stream, and collect on or within the filter. The existence of any pathway for the gas to flow around the filter results in less efficient collection of the products and should be avoided. Efficiency of collection decreases if there are substantial ways to bypass the filter. Preferably, the filter is in the form of a bag which provides for a large surface area. The bag is selected to be compatible with the synthetic process used for carbon nanomaterial production. Filter bags are preferably flexible and are typically positioned in a support structure for positioning in the flow of product gas.

Many types of filter bags are commercially available and thus provide an economical means for collecting the carbon nanomaterial product. Ceramic fiber filter bags useful for the present invention include the 3M™ FB-900 bag and the 3M™ Nextel™ bag. In 3M™'s product literature, the 3M™ FB-900 bag is described as comprised of a woven glass textile with a proprietary inorganic coating. Nextel™ is a trademark used for ceramic fibers with a range of compositions including aluminoborosilicate, aluminosilica, alumina zirconia yttria, and alumina. Fiberglass, polymer fiber, and Teflon™-coated polymer fiber bags (e.g., U.S. Pat. No. 4,983,434) can be used in the system and methods of this invention if the gas temperature is low enough (below about 300° C.). Preferably, the pore size of the filter is less than about 10 microns. Filters with large pores (>10 microns) are generally less desirable and may exhibit lower recovery rates of carbon nanomaterials. However, if the product cakes during synthesis, the larger pore size filters will be acceptable for product recovery.

The filter bag is supported to maintain its shape during filtration and during cleaning without substantially inhibiting gas flow through the filter. The filter bag support is not specifically illustrated in FIG. 1. A variety of filter bag support cages are known to those skilled in the art. U.S. Pat. Nos. 4,259,095 and 5,800,580 describe forms of filter bag support. A preferred support cage is a wire frame, as can be obtained from National Filter Media Inc., Salt Lake City, Utah.

The filter chamber also has an inlet (5) connected to the filter cleaning mechanism (20), which functions to dislodge captured solids from the filter. As shown in FIG. 1, inlet (5) communicates with the filter chamber through valve (22). The valve (22) may be located inside or outside of the filter chamber. Parts of the filter cleaning mechanism (e.g., the orifice used to create a jet) can extend past inlet (5) into filter chamber (1), as is described below in FIG. 2.

In certain embodiments, the filter cleaner apparatus comprises a gas delivery conduit for creating gas flow through the gas permeable filter. Preferred gases for filter cleaning are those gases that do not adversely affect the ongoing synthesis, introduce undesired contaminants or adversely affect the products collected. Exemplary suitable gases for filter cleaning include nitrogen, argon and air. The source of gas can, for example, be a tank (24) of commercial quality solids-free gas. The gas source is preferably pressurized to a pressure of at least about 25 psi as supplied to the delivery conduit. The gas pressure is preferably high enough to generate gas pulses of sufficient force to dislodge solids from the filter. Preferably, the pressure is at least about 100 psia. More preferably, the pressure is about 115 psia. Appropriate pressure regulation devices can be employed to adjust the pressure of gas introduced into the system for filter cleaning. In a preferred configuration, the cleaning gas is delivered to create a reverse flow of gas to the filter. By "reverse flow", it is meant that the cleaning gas is delivered so that it flows from the downstream side (filter chamber exhaust side) of the filter to the upstream side of the filter. Preferably, reverse gas flow through the filter is created by a vigorous jet pulse acting on the downstream side of the filter, although methods for creating gentler reversed flow will also perform adequately.

One particularly effective method for cleaning the filter is by using one or more gas pulses to create a shock wave that travels the length of the filter bag. The shock wave physically vibrates the filter bag, removing the material collected on the surface. Such a method has been described for a system of filter bags in U.S. Pat. No. 4,082,523.

Creating a jet pulse of gas involves creating a jet and creating a pulsing action of the jet. Filter bag cleaning apparatus employing jet pulses of gas are known as "pulse jet" cleaners. A jet can be made to act on the downstream side of the filter by appropriately locating a jet forming orifice on the downstream side of the filter and rapidly discharging high pressure gas through the orifice to form the jet. The jet-forming orifice is not shown in FIG. 1; it may be a venturi nozzle for best performance, but any gas inlet will perform some cleaning action. The jet is designed to dislodge the solids from the filter bag, primarily off the upstream side of the filter bag. A pulsing action of the jet is created by opening and closing valve (22) located between the tank of high-pressure gas and inlet (5). Exemplary methods for creating pulse jet systems for dislodging solids from filter bags are described in U.S. Pat. Nos. 3,739,557, 5,395,409, and 5,837,017, which are useful for application to the methods and devices herein. A pulse jet system which can be readily adapted for use in reactors for generation of carbon nanomaterials is commercially available from Nation Filter Media, Inc. (Salt Lake City, Utah).

More than one filter bag and pulse jet cleaner can be employed simultaneously in the same reactor system, which has the advantage of increasing filter surface area. One or more filters that may differ in size, shape or materials with accompanying cleaners can be employed in a reactor system. As the rate of production of carbon nanomaterials increases, increased filtering capacity is created by introducing additional filters or by increasing the size of existing filters. The cleaning of multiple filters can be performed simultaneously or sequentially.

In FIG. 1, carbon nanomaterials are removed from the filter chamber through a valve (9) at the bottom of the filter chamber. In the illustrated embodiment, the bottom or floor of the filter chamber functions as a product receptor or collector. As a jet pulse releases carbon nanomaterials from the filter, they fall under gravity to the bottom of the filter chamber. Valve (9) can then be opened to remove collected product. Product can be removed through valve (9) into a closed collection canister, for example.

Other access devices for removing carbon nanomaterials from the filter chamber can include, without limitation, an Archimedes screw at the bottom of the filter chamber. An automatic brush within the filter chamber or a brush manually operated via a feed through connection can be employed to assist in carbon nanomaterial collection. Preferably, the carbon nanomaterials are removed into a closed container to prevent exposure to humans and to minimize losses through fine aerosol formation. The collector can be replaced, and valve(s) reopened to receive more nanomaterials without interrupting synthesis.

The filter chamber also has an exhaust outlet (7). The exhaust gas from the filter chamber (which is the exhaust gas from the reactor with product removed) can be conveyed to a heat exchanger, vacuum pump, and/or scrubbing system before being exhausted.

The cleaning mechanism can be manually actuated by an operator, or automated according to a predetermined schedule or responsive to a change in a system parameter. For example, cleaning may be triggered by an increase in pressure upstream of the filter or a drop in pressure or gas flow downstream of the filter. Pressure responsive actuation of filter cleaning requires a pressure sensor within the reactor system and an appropriate electronic relay circuit for actuation of the cleaning mechanism, e.g., actuation of gas inlets.

The components of a reactor system (upstream of the filter) are specific to the synthesis method employed and will vary accordingly. For example, different types of carbon nanomaterial products (or different relative amounts of such products) can be generated using different synthesis methods (e.g., combination or arc synthesis processes). Optimal reactor conditions (e.g., flow rate, temperature, starting materials and relative amounts of starting materials) for generation of a selected type of product may be different even when the same synthesis method is used. The combustion synthesis of fullerenes, in particular, is generally conducted under vacuum (e.g., 20–200 torr). Therefore, the exhaust gas from the filter is conveyed to a vacuum pump, although components such as a heat exchanger or scrubbing system may be placed in the exhaust line before the vacuum pump. Optimal pressures for synthesis of carbon nanomaterial may be higher than those for fullerenes. One of ordinary skill in the art can select pressure and flow rate for optimizing production of a given carbon nanomaterial without resort to undue experimentation.

The collection filter device of this invention performs two important functions. First, it filters carbon nanomaterials entrained in a gas stream allowing their collection. Second, the filter cleaning apparatus of the device prevents carbon buildup on the filter without disrupting the carbon nanomaterial synthesis process. For example, for synthesis methods that require low pressure, a filter cleaning system as described allows the collection of condensables including carbon nanomaterials to be efficiently removed from the filter, restoring the pump performance necessary to maintain the low pressure for carbon nanomaterial production.

For single-walled nanotube (SWNT) synthesis methods at or near atmospheric pressure, the use of the filter cleaning mechanism of this invention is of particular benefit to prevent pressure build-up. Prevention of carbon build-up on the filter allows the carbon nanomaterial synthesis process to run for longer intervals than are currently available and can be used to facilitate continuous operation of the synthesis process.

Figure 2:
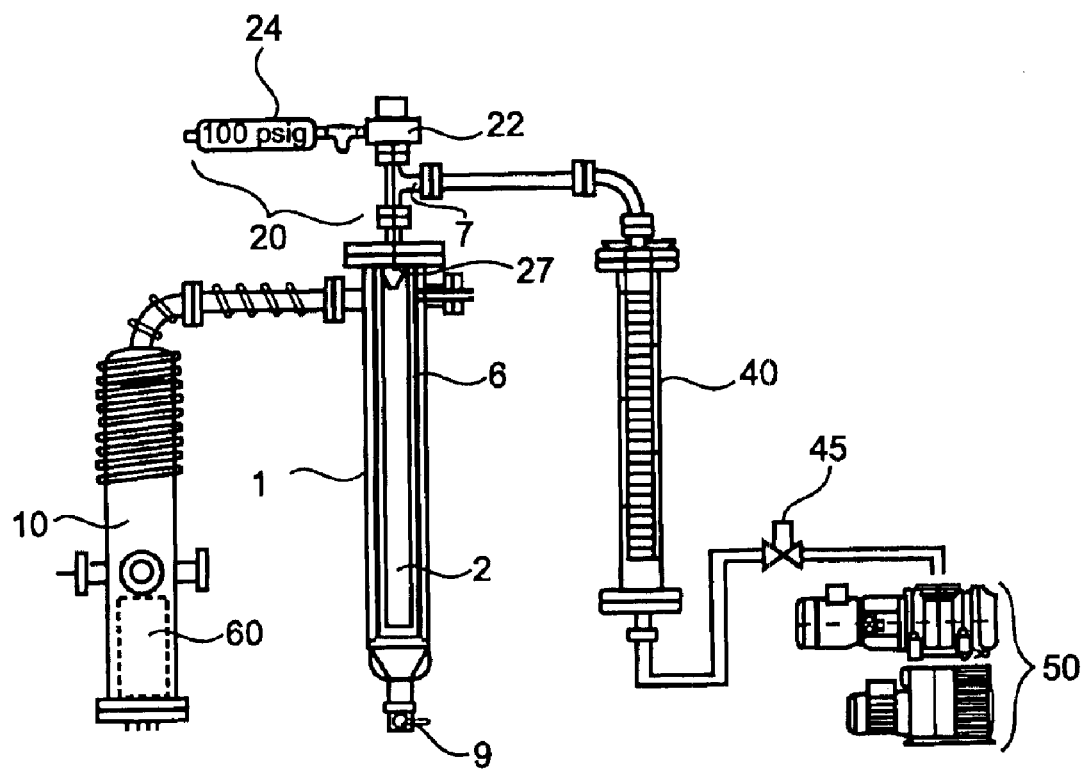
FIG. 2 schematically illustrates a combustion apparatus for fullerene production which incorporates a pulse jet-cleaned filter device of the present invention.

FIG. 2 shows a reactor of this invention configured for continuous operation to generate carbon nanomaterials. The reactor is exemplified as a combustion apparatus for production of carbon nanomaterials and particularly for production of fullerenes. The reactor incorporates a pulsed jet cleaned filter device of the present invention operated to provide reversed flow. In the illustrated embodiment, a burner (60) is enclosed within the synthesis reactor (10). The synthesis reactor is connected to filter chamber (1) that contains filter bag (2). The filter bag is supported, for example, by a support cage to retain its shape and position for passage of product gas flow through the filter. The filter chamber also contains a water-cooled annulus (6) for connection to the synthesis chamber that helps cool and distribute the gas flow from the synthesis chamber. The temperature of the annulus is kept sufficiently high to avoid product deposition in the annulus. The filter cleaning mechanism (20) is a pulsed jet system. The pulse jet system can use a 100 psi nitrogen tank as a source of pressurized gas and create a jet acting on the downstream side of the filter by passing the nitrogen through a Venturi nozzle (27). In this embodiment, the valve (22) of the pulse jet system opens and closes rapidly to allow a rapid pulse of gas to flow from the gas reservoir (24) into filter chamber (1). The exhaust gas is connected to a heat exchanger (40), pressure controller throttle valve (45) and vacuum pumps (50). The combustion apparatus shown in FIG. 2 can contain a burner with a porous refractory burner plate as described in concurrently filed U.S. application, (U.S. application Ser. No. 10/098, 829). Further information about other elements of the combustion apparatus is given in this same reference.

For an apparatus similar to that shown in FIG. 2, when a sooting flame was used for fullerene synthesis as described in concurrently a 3M FB-900 filter bag recovered substantially all of the carbon nanomaterials including fullerenes and fullerenic soot that was produced.

In other embodiments of the invention, the filter and/or the jet cleaning system can be placed within the synthesis chamber. This is especially useful for horizontal or down-flowing synthesis methods, as gravity assists the product into the receptor or collector. The orientation of the filter may be changed, as it will also perform when placed horizontally, or at an angle.

The invention provides a method for carbon nanomaterial collection comprising the steps of:

providing a carbon nanomaterial synthesis reactor which produces a product gas flow which entrains at least one carbon nanomaterial;

providing at least one filter positioned so as to intercept a substantial portion of the product gas stream;

collecting the carbon nanomaterial with the filter;

removing at least part of the carbon nanomaterial collected by the filter with a reverse flow of inert gas; and collecting the carbon nanomaterial removed from the filter.

The method for collecting carbon nanomaterial can be made continuous if the synthesis method is selected to be compatible with the filter cleaning method for removing carbon nanomaterial from the filter. The synthesis method is compatible with the method for removing carbon nanomaterial from the filter when removal of carbon nanomaterial from the filter does not significantly interrupt the synthesis process. Surprisingly, it has been found that pulsed jet cleaning of a filter bag device located after a sooting flame fullerene synthesis chamber can be performed without permanently extinguishing the flame when the burner in use has a non-cooled surface. Compatibility between a pulsed jet cleaning method and a sooting flame fullerene synthesis chamber was demonstrated by a hot burner and reactor as described in concurrently filed U.S. application, (U.S. application Ser. No. 10/098,829) with a filtering device of this invention.

Without wishing to be bound by any specific theory, it is believed that if pulsed jet cleaning does extinguish the flame, the hot burner plate will reignite the burner after the burner has undergone a warm-up period. For the burners described in concurrently filed U.S. application, (U.S. application Ser. No. 10/098,829) the warm up time was up the order of 10 to 20 minutes. Compatibility may also be obtained for fullerene synthesis chambers not incorporating a hot burner by adding a pilot light to automatically reignite the flame when it is extinguished by pulse jet cleaning. Application of the device herein allows creation of a combustion apparatus where the carbon product can be collected in substantial quantities (rather than being collected in relatively small quantities with a probe) without interrupting the synthesis.

Those of ordinary skill in the art will appreciate the existence of equivalents of device elements, method steps, and materials, all known functional equivalents of which are encompassed by the invention. Those of ordinary skill in the art will also appreciate that device elements methods and materials other than those specifically described herein can be employed in the devices and methods of this invention. For example, while filter cleaning mechanisms employing pulsed gas jets have been described in detail herein, other mechanisms for applying a motive force to a filter are known in the art and can be readily adapted for use in the systems herein. For example, U.S. Pat. No. 3,955,947 describes a method for in situ cleaning filters by striking the filter bag supports. All references cited herein are hereby incorporated by reference to the extent that they are not inconsistent with the disclosure herewith.

We claim:

1. A reactor system for synthesis of carbon nanomaterials under vacuum which comprises a reactor chamber for generation of a product gas flow containing carbon nanomaterials and a filter device, wherein the filter device comprises:
   one or more gas permeable filters positioned within the reactor system to capture carbon nanomaterials produced by gas phase reaction;
   a filter cleaning mechanism for dislodging captured carbon nanomaterials from the one or more gas-permeable filters wherein the dislodging occurs while one or more of the filters are in place in the reactor system and without halting synthesis of carbon nanomaterials; and
   a source of vacuum in fluid communication with the reactor chamber.

2. The reactor system of claim 1 which is a combustion system.

3. The reactor system of claim 1 wherein the filter cleaning mechanism provides for gas delivery to the one or more filters to dislodge captured carbon nanomaterials.

4. The reactor system of claim 1 wherein the filter cleaning mechanism comprises a gas inlet in fluid communication with a source of gas and a valve that can be selectively operated for delivery of the gas to the one or more filters.

5. The reactor system of claim 4 wherein the gas inlet comprises a jet-forming orifice and the valve is selectively operated to convey pulses of gas to the filter.

6. The reactor system of claim 5 wherein the pulses of gas are conveyed to the downstream side of the one or more filters.

7. The reactor system of claim 1 further comprising a filter chamber containing the one or more filters and in fluid communication with the synthetic reaction chamber wherein the product gas flow from the synthetic reaction chamber enters the filter chamber and passes through the one or more filters.

8. The reactor system of claim 6 wherein the filter cleaning mechanism comprises one or more jet-forming orifices in the filter chamber and in fluid communication through a valve with a pressurized source of gas.

9. The reactor system of claim 8 wherein the one or more jet-forming orifices are positioned within the filter chamber to direct gas pulses to the downstream side of the one or more filters.

10. The reactor system of claim 9 wherein the filter is made of ceramic fibers.

11. The reactor system of claim 10 wherein the filter has a pore size of 10 microns or less.

12. A combustion system for production of carbon nanomaterials which comprises one or more burners for generating carbon nanomaterials, one or more inlets upstream of the one or more burners for delivery of a gas flow comprising hydrocarbon fuel and oxygen to the one or more burners, at least one ignition source for the one or more burners, a reduced pressure chamber in fluid communication with the one or more burners to provide reduced pressure downstream of the one or more burners for generating a gas flow containing carbon nanomaterials, one or more filters in the reduced pressure chamber downstream of the one or more burners positioned to receive the gas flow containing carbon nanomaterials and capture carbon nanomaterials in the gas flow, one or more gas inlets into the reduced pressure chamber for selective introduction of gas to dislodge carbon nanomaterials from the one or more filters, one or more outlets in the reduced pressure chamber for removal of carbon nanomaterials dislodged from the one or more filters from the reduced pressure chamber and a source of vacuum in fluid communication with the reduced pressure chamber, wherein dislodging the carbon nanomaterials from the one or more filters and removal of the carbon nanomaterials from the reduced pressure chamber does not require interruption of the gas flow of carbon nanomaterials from the one or more burners.

13. The combustion system of claim 12 wherein the gas flow is directed at the downstream side of the filter to dislodge carbon nanomaterials.

14. The combustion system of claim 13 wherein the one or more gas inlets are jet-forming orifices in fluid communication with a pressurized source of gas.

15. A method for collecting a carbon nanomaterial comprising the steps of:
   providing a carbon nanomaterial synthesis chamber which produces a product gas flow which entrains at least one carbon nanomaterial;
   providing one or more filters positioned to intercept the product gas flow and capture the carbon nanomaterial;
   dislodging at least part of the carbon nanomaterial captured by the one or more filters without removing one or more of the filters from the product gas flow; and
   collecting the carbon nanomaterial dislodged from the filter without halting carbon nanomaterials synthesis wherein the synthesis of carbon nanomaterials is conducted under vacuum.

16. The method of claim 15 wherein carbon nanomaterials are dislodged from the filter by introducing a flow of gas in contact with the one or more filters.

17. The method of claim 16 wherein the flow of gas is a jet-pulsed flow.

18. The method of claim 17 wherein the jet-pulsed flow of gas is directed to the downstream side of the one or more filters.

19. The method of claim 17 wherein jet-pulses of gas are introduced periodically to dislodge carbon nanomaterials.

20. The method of claim 19 wherein jet-pulses of gas are introduced to dislodge carbon materials responsive to an increase in pressure upstream of the one or more filters above a maximum selected pressure.

21. The method of claim 20 wherein jet-pulses of gas are automatically introduced at selective time intervals.

22. The method of claim 16 wherein dislodged carbon nanomaterials are collected into a collector which can be selectively isolated from the flow of product gas by selective operation of a valve.

23. The method of claim 15 wherein the carbon nanomaterials are dislodged from the one or more filters by application of a motive force to the one or more filters.

24. The method of claim 15 wherein the synthesis of carbon nanomaterials is conducted under a vacuum of between about 20 and about 200 torr.

25. The combustion system of claim 12 wherein the vacuum in the reduced pressure chamber is between about 20 and about 200 torr.

26. The reactor system of claim 1 wherein the vacuum in the reactor chamber is between about 20 and about 200 torr.

27. The reactor system of claim 4, wherein the pressure of the gas source is at least about 25 psi.

28. The combustion system of claim 14, wherein the pressure of the gas source is at least about 25 psi.

29. The method of claim 17 wherein the flow of gas is from a source pressurized to at least about 25 psi.

30. The reactor system of claim 1 wherein the carbon nanomaterials are fullerenes.

31. The combustion system of claim 12 wherein the carbon nanomaterials are fullerenes.

32. The method of claim 15 wherein the carbon nanomaterials are fullerenes.

33. The reactor system of claim 1 wherein the filter is a flexible bag filter.

34. The combustion system of claim 12 wherein the filter is a flexible bag filter.

35. The method of claim 15 wherein the filter is a flexible bag filter.

36. The reactor system of claim 1 further comprising a collector for carbon nanomaterials positioned with respect to the one or more filters for receiving carbon nanomaterials dislodged there from and from which collected carbon nanomaterials can be removed without halting synthesis of carbon nanomaterials.

37. The method of claim 3 wherein the filter cleaning mechanism is a reverse flow cleaning mechanism.

* * * * *